United States Patent [19]
Winckler

[11] Patent Number: 5,026,157
[45] Date of Patent: Jun. 25, 1991

[54] MAGNETIC MOTION DAMPING SYSTEM FOR PENDULOUS COMPENSATOR

[75] Inventor: Peter S. Winckler, Dayton, Ohio

[73] Assignee: Spectra-Physics, Inc., San Jose, Calif.

[21] Appl. No.: 380,611

[22] Filed: Jul. 14, 1989

[51] Int. Cl.$^5$ .............................................. G01C 9/12
[52] U.S. Cl. .................................. 356/250; 356/149; 33/283
[58] Field of Search ..................... 356/138, 149, 250; 250/230; 73/430; 33/283, DIG. 21

[56] References Cited

U.S. PATENT DOCUMENTS

| | | | |
|---|---|---|---|
| 3,771,876 | 11/1973 | Ljungdahl et al. | 356/250 |
| 4,065,974 | 1/1978 | Ever et al. | 73/430 |
| 4,679,937 | 7/1987 | Cain et al. | 250/230 |
| 4,801,791 | 1/1989 | Cain | 356/250 |
| 4,854,704 | 8/1989 | Funazaki et al. | 356/149 |

Primary Examiner—Samuel Turner
Attorney, Agent, or Firm—Killworth, Gottman, Hagan & Schaeff

[57] ABSTRACT

Motion damping apparatus is provided for use in a light beam projector including a light beam and a pendulous compensator adapted to movably support a mirror for deflecting the light beam to compensate for tilting of the projector. The apparatus comprises at least one motion damping plate formed of an electrically conducting material and coupled to the pendulous compensator. Magnets are positioned adjacent the damping plate for generating a magnetic field through which the plate passes as the result of motion of the pendulous compensator such that the motion is damped by the interaction of magnetic fields produced by the magnets and by eddy currents generated in the plate by its movement within a magnetic field. The motion damping plate preferably is curvilinear and coupled to the pendulous compensator to move in substantial conformity with a corresponding curvilinear plane defined by the movement of the pendulous compensator. In this way, the plate can be closely spaced to the magnets for efficient damping operation with the spacing being substantially maintained without contact between the plate and the magnets throughout the operating range of the pendulous compensator.

20 Claims, 8 Drawing Sheets

MAGNETIC MOTION DAMPING SYSTEM FOR PENDULOUS COMPENSATOR

CROSS REFERENCE TO RELATED APPLICATION

This application is related to an application entitled Pendulous Compensator for Light Beam Projector (SPC 029 PA) which was filed on even date herewith and is assigned to the same assignee as the present application.

BACKGROUND OF THE INVENTION

The present invention relates generally to light beam projectors including pendulous compensators and, more particularly, to apparatus for damping motion of a pendulous compensator to rapidly stabilize the light beam emanating from such a projector.

Light beam, typically laser beam, systems are used in leveling, squaring and other alignment and control functions in the building and construction industries. When using light beam systems, it is important to be able to position a light beam source or projector such that the light emitted by the projector is maintained in a desired orientation for example horizontal or at a selected angle relative to horizontal. Since stable horizontal leveling of the projector may be difficult, particularly at a construction site, prior art light beam projectors have employed pendulous compensators to direct a vertically emanating light beam in a desired horizontal direction regardless of whether the projector is tilted and hence not absolutely horizontal.

Figure 1:
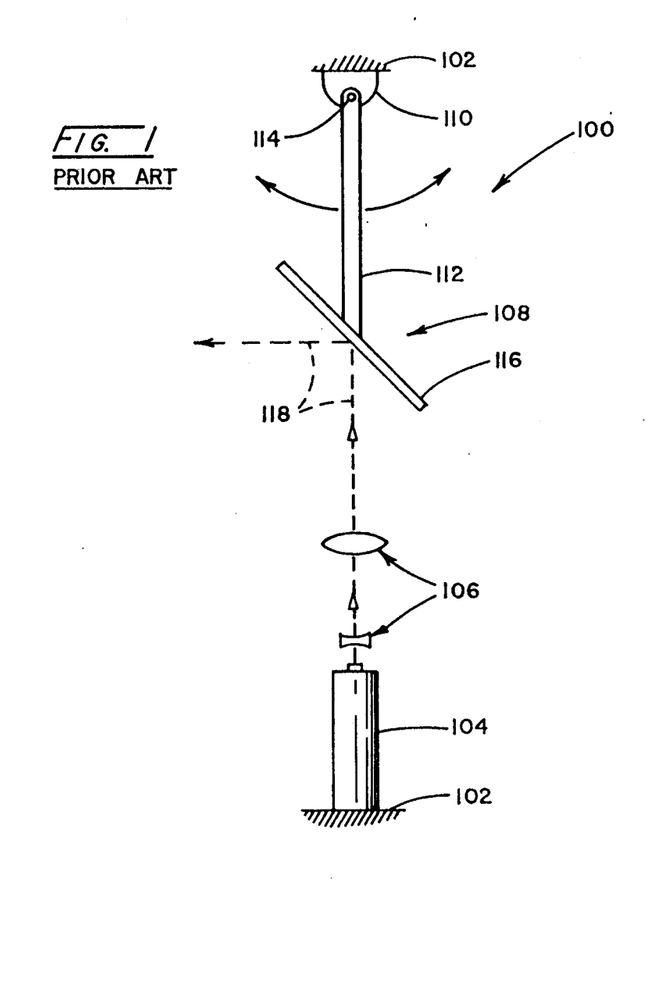
FIG. 1 and 2 are simplified schematic diagrams of a laser beam projector including a prior art pendulous compensator as previously described in the "Background of the Invention"

A simplified schematic diagram of a laser beam projector 100 including a housing 102, a laser beam source 104, focusing lenses 106 and a conventional pendulous compensator 108 is shown in FIG. 1. The pendulous compensator 108 is shown as being mounted to a bracket 110 and comprising a pendulum arm 112 pivotally coupled to and suspended downwardly from the bracket 110 for pivotal movement within a plane perpendicular to a pivot axis 114 of the arm 112, and a beam reflecting mirror 116 fixedly attached to the lower end of the arm 112. The laser beam source 104 and the bracket 110 are fixedly attached to the housing 102 and aligned such that a laser beam 118 projected upwardly from the laser beam source 104 lies within the pivot plane of the arm 112 and preferably passes through the pivotal axis 114 of the pendulum arm 112 if the arm 112 and beam reflecting mirror 116 are removed.

When the projector 100 is placed in a true horizontal orientation, the laser beam 118 is emitted in a true vertical orientation and the pendulum arm 112, which in theory due to gravity always assumes a true vertical orientation, is aligned with the laser beam 118. The laser beam 118, which is first focused and collimated by the lenses 106, is reflected by the mirror 116 in the horizontal direction within the pivot plane of the pendulum arm 112. If the laser beam projector 100 becomes tilted away from horizontal, such tilting is compensated by the movement of the pendulum arm 112. However, if the pendulum arm 112 is freely movable about the axis 114, compensation errors result. Accordingly, a pair of counterbalancing springs 120 may be connected between the pendulum arm 112 and the housing 102 to correct the errors which would be created by true pendulous motion of the arm 112.

Figure 2:
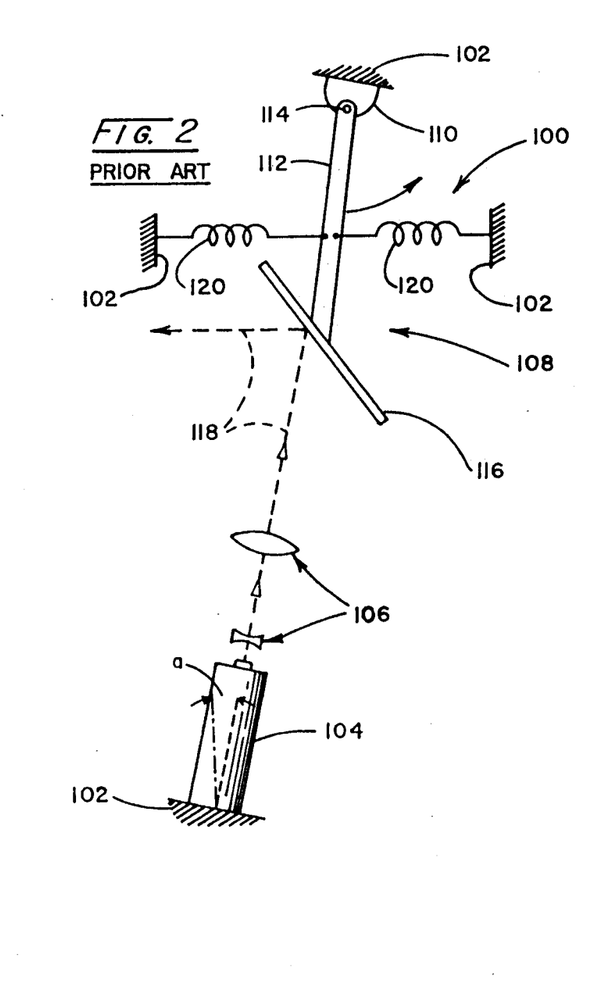

As seen in FIG. 2, the housing 102 and hence the laser beam 118 are oriented at an angle "a" relative to vertical. However, the pendulum arm 112 biased by the springs 120 is now displaced counterclockwise about the axis 114 from the line of emergence of the laser beam 118 through an angle "a/2" which compensates for the angular tilt of the housing 102. In accordance with known operating principles of the pendulous compensator 108, the laser beam 118 continues to be reflected by the mirror 116 in the horizontal direction. As an alternative to the counterbalancing springs 120, the pendulum arm 112 can be cantilevered or fixedly mounted to the housing 102 with the arm 112 formed such that it bends or deflects to compensate for tilting movement of the projector 100.

The operation of a pendulous compensator as just described is satisfactory if the projector incorporating the compensator is not subject to vibrations and can tolerate substantial stabilization times whenever the projector is initially positioned or moved. However, errors arise from oscillations of the pendulum arm due to vibrations which commonly occur in building and construction environments, and extended settling or stabilization times are a source of frustration and cost time and money.

Pneumatic and eddy current motion damping arrangements have been used in the past in an attempt to nullify vibrations and reduce settling times. For example, see U.S. Pat. No. 4,679,937 which issued to Gary Cain et al on July 14, 1987 and is assigned to the same assignee as the present invention. Unfortunately, both arrangements have various drawbacks. In the case of pneumatic damping, temperature variations can produce substantial errors or require complicated and not totally effective compensation arrangements. Further, pneumatic damping arrangements are somewhat difficult to adjust to provide the required damping and oftentimes over or under damping of the pendulous compensator result. Previous attempts at eddy current damping for pendulous compensators have not proven to be very effective for low velocity damping and would not permit operation of the pendulous compensator over an extended range of tilt angles.

Accordingly, there is a need for an improved damping arrangement for pendulous compensators used in light beam projectors which can effectively damp motion in a pendulous compensator over a substantial temperature range and an extended range of tilt angles of the light beam projectors.

SUMMARY OF THE INVENTION

This need is met by the apparatus of the present invention wherein a plate formed of electrically conductive material is coupled to a pendulous compensator and a magnetic field is produced through which the plate moves as the result of motion of the pendulous compensator. Motion of the pendulous compensator is damped by forces applied to the plate due to the interaction of the magnetic field around the plate and a magnetic field produced in the plate due to its movement within a magnetic field. The magnetic field produced in the plate results from eddy currents generated within the plate by its movement within a magnetic field.

In accordance with one aspect of the present invention, motion damping apparatus is provided for use in a light beam projector including a light source for generating a light beam and a pendulous compensator adapted to movably support a mirror for deflecting the light beam to compensate for tilting of the projector.

The apparatus damps motion of the pendulous compensator to rapidly stabilize the light beam emanating from the projector and comprises at least one motion damping plate formed of an electrically conducting material and coupled to the pendulous compensator. Magnetic means is positioned adjacent the at least one motion damping plate for generating a magnetic field through which the plate passes as the result of motion of the pendulous compensator such that motion of the pendulous compensator is damped by the interaction of magnetic fields produced by the magnetic means and by eddy currents generated in the plate.

The magnetic means may be positioned on both sides of the at least one motion damping plate. The at least one motion damping plate may be curvilinear and coupled to the pendulous compensator to move in substantial conformity with a curvilinear plane defined by movement of the pendulous compensator with the magnetic means being positioned on opposite sides of the curvilinear plane. In this way, the at least one plate can be closely spaced to the magnetic means for efficient damping operation of the apparatus and the spacing is substantially maintained without contact between the plate and the magnetic means throughout the operating range of the pendulous compensator.

The magnetic means may comprise at least two rare earth magnets positioned on a first side of the curvilinear plane and at least two rare earth magnets positioned on a second side of the curvilinear plane. The rare earth magnets on each side of the curvilinear plane are aligned and oppositely poled relative to one another in the direction of maximum movement of the pendulous compensator and the magnets on opposite sides of the curvilinear plane are substantially aligned with one another and oppositely poled across the curvilinear plane. The magnetic means may further comprise two or more sets of at least two rare earth magnets with the sets being either like poled or oppositely poled in a direction perpendicular to the direction of maximum movement of the pendulous compensator.

The magnetic means may also comprise at least one pair of rare earth magnets positioned on a first side of the curvilinear plane and at least one pair of rare earth magnets positioned on a second side of the curvilinear plane. The pairs of rare earth magnets may be substantially aligned and oppositely poled relative to one another in a direction of maximum movement of the pendulous compensator and also across the curvilinear plane.

The magnetic means may additionally comprise two pairs of rare earth magnets positioned on a first side of the curvilinear plane and two pairs of rare earth magnets positioned on a second side of the curvilinear plane. The pairs of rare earth magnets may be oppositely poled relative to one another in a direction of maximum movement of the pendulous compensator and in a direction perpendicular thereto, and be substantially aligned and oppositely poled across the curvilinear plane. Alternately, the pairs of rare earth magnets may be oppositely poled in a direction of maximum movement of the pendulous compensator and like poled in a direction perpendicular thereto, and substantially aligned and oppositely poled across the curvilinear plane. The pairs of rare earth magnets may be oriented at an acute angle relative to the direction of maximum movement of the pendulous compensator such that a majority of the damping force is directed in the direction of maximum movement of the pendulous compensator and the remainder of the damping force is directed perpendicular thereto. The at least one motion damping plate is preferably formed of copper and may comprise two motion damping plates coupled to opposite sides of the pendulous compensator.

A particularly advantageous pendulous compensator may comprise first pulley means secured to the light beam projector for supporting the pendulous compensator, pendulum mirror means for receiving a light beam from the light beam source and reflecting the light beam in a desired angular orientation, second pulley means for supporting the pendulum mirror means beneath the first pulley means, and support means for suspending the second pulley means from the first pulley means. For this form of pendulous compensator, the at least one motion damping plate is connected to the second pulley means, is curvilinear and moves in substantial conformity with a curvilinear plane defined by movement of the second pulley means. The magnetic means is positioned on opposite sides of the curvilinear plane such that the at least one plate can be closely spaced to the magnetic means for efficient damping operation of the apparatus and the spacing is substantially maintained without contact between the plate and the magnetic means throughout the operating range of the pendulous compensator.

The magnetic means may comprise at least one pair of rare earth magnets positioned on each side of the curvilinear plane, substantially aligned and oppositely poled relative to one another in a direction of maximum movement of the second pulley means and also across the curvilinear plane.

The magnetic means may also comprise two pairs of rare earth magnets positioned on each side of the corresponding curvilinear plane, the pairs of rare earth magnets being substantially aligned across the curvilinear plane and oppositely poled in the direction of maximum movement of the second pulley means, in a direction perpendicular thereto and also across the curvilinear plane. Alternately, the magnetic means may comprise two pairs of rare earth magnets positioned on each side of the curvilinear plane and substantially aligned across the curvilinear plane. The pairs of rare earth magnets are oppositely poled in a direction of maximum movement of the second pulley means, like poled in a direction perpendicular thereto and oppositely poled across the corresponding curvilinear plane. The pairs of rare earth magnets may be oriented at an acute angle relative to a direction of maximum movement of the second pulley means such that a majority of a damping force is directed in the direction of maximum movement of the second pulley means and the remainder of the damping force is directed perpendicular thereto. Preferably, the at least one motion damping plate is formed of copper. The magnetic means may also comprise at least two rare earth magnets or two or more sets of at least two rare earth magnets as previously described.

It is an object of the present invention to provide improved apparatus for damping a pendulous compensator incorporated into a light beam projector; to provide improved apparatus for damping a pendulous compensator incorporated into a light beam projector wherein at least one electrically conductive motion damping plate is coupled to the pendulous compensator and moved through a magnetic field to generate eddy current induced magnetic fields which interact with the inducing magnetic field to damp motion of the pendulous compensator; and, to provide improved apparatus for damping a pendulous compensator incorporated into a light beam projector wherein a curvilinear motion damping plate is moved along a curvilinear plane defined by motion of the pendulous compensator to maintain close spacing between the plate and magnetic field inducing means positioned adjacent the curvilinear plane to thereby maintain highly efficient motion damping throughout a substantial angular tilt of a light beam projector.

Other objects and advantages of the invention will be apparent from the following description, the accompanying drawings and the appended claims.

DETAILED DESCRIPTION OF THE INVENTION

Figures 3, 3A:
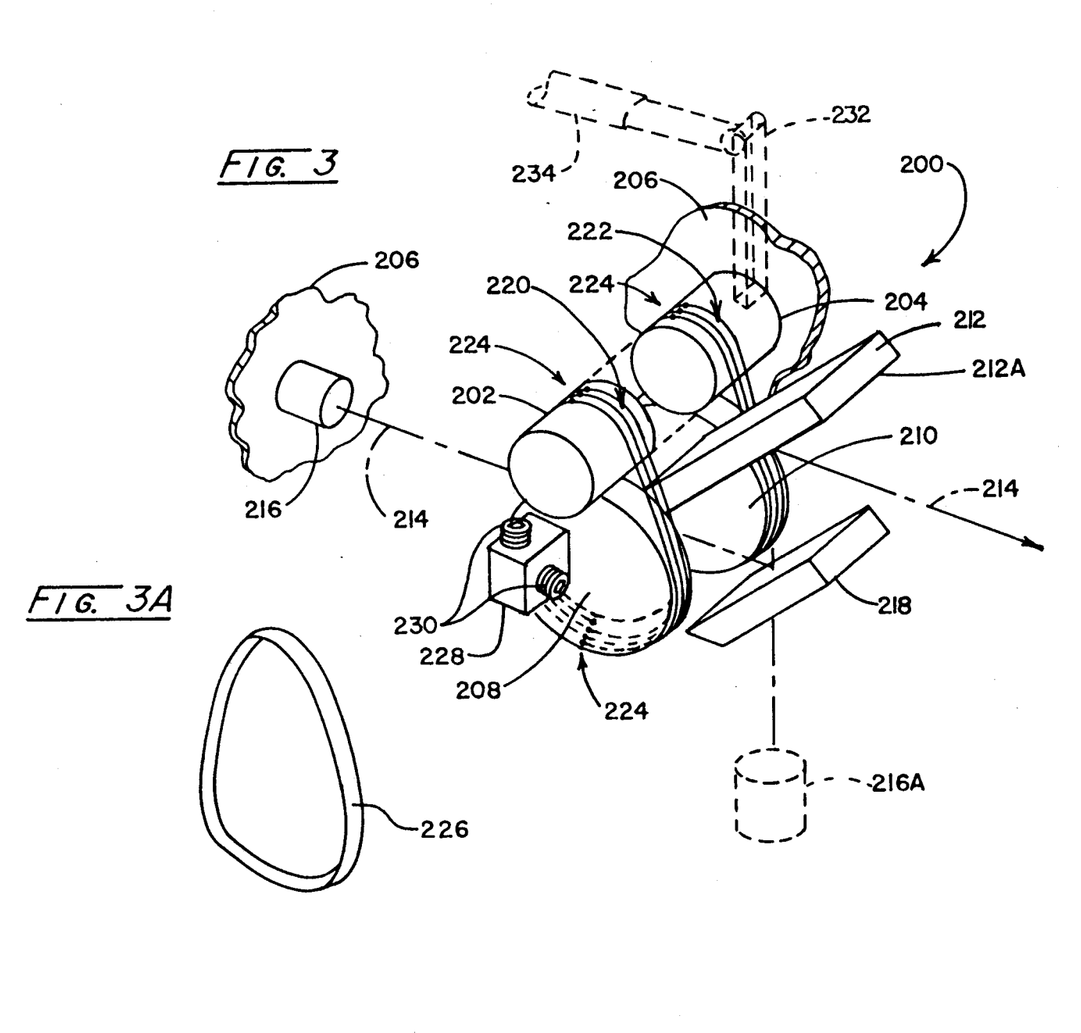
FIG. 3 is a schematic perspective view of a particularly advantageous pendulous compensator.
FIG. 3A is a perspective view of a loop of material which may be used in the pendulous compensator of FIG. 3.

Reference is now made to FIG. 3 which illustrates in schematic perspective a particularly advantageous pendulous compensator 200 for use in a light beam projector to maintain a projected light beam in a desired horizontal direction or at a selected angular orientation relative to horizontal. As shown in FIG. 3, the pendulous compensator 200 includes first pulley means comprising first and second upper pulleys 202, 204 which are spaced from one another and secured to a housing 206 of an associated light beam projector. Second pulley means comprising first and second lower pulleys 208, 210 are positioned beneath the first and second upper pulleys 202, 204, respectively. Pendulum mirror means, comprising a pendulum mirror 212, is secured to and supported between the first and second lower pulleys 208, 210 for receiving a light beam 214 from a light beam source 216 on one side 212A of the pendulum mirror 212 and for reflecting the light beam 214 from the one side 212A in a desired angular orientation relative to horizontal. The ratio of the second pulley means to the first pulley means is substantially 2-to-1.

In FIG. 3, the light beam 214 is directed at a 0° orientation relative to horizontal, i.e. the light beam 214 is directed horizontally; however, the angular orientation or grade angle of the beam 214 also can be selected as will be described. As shown in FIG. 3, the light beam 214 originates in a generally horizontal orientation and is reflected to the pendulum mirror 212 by a folding mirror 218, the light beam source could also be provided in other orientations with appropriate realignment of the folding mirror 218 or in a generally vertical orientation as shown by the dotted line source 216A with the folding mirror 218 being eliminated.

The first and second lower pulleys 208, 210 are suspended from the first and second upper pulleys 202, 204 by support means comprising filaments, tapes, loops or the like. As shown in FIG. 3, the support means comprise first and second boron monofilament strands 220, 222 which are looped three times around the first upper and lower pulleys 202, 208, and the second upper and lower pulleys 204, 210, respectively. To prevent interference with the operation of the pendulous compensator 200, the first and second boron monofilament strands 220, 222 preferably originate and terminate on the lower sides of the first and second lower pulleys 208, 210 where both ends of the strands are secured to the first and second lower pulleys 208, 210 by dabs 224 of an appropriate adhesive or otherwise. The boron monofilament strands 220, 222 may also be secured to the upper sides of the first and second upper pulleys 202, 204 again by dabs 224 of adhesive or other appropriate means.

Alternately, the lower pulleys 208, 210 can be suspended from the upper pulleys 202, 204 by tapes or continuous loops of material, for example loops of titanium foil as shown by a loop 226 in FIG. 3A. However, strands or filaments are preferred since tapes or bands require steep edge guides (not shown) or else they may wrap helically when the projector is subjected to a side tilt and result in errors. Strands or filaments also appear less vulnerable to side tilt perhaps due to a slight twist tolerance or a lower friction coefficient and also are much less likely to entrap grit at critical radius locations than tapes or bands. Strands or filaments also permit convenient multiple looping for strength without notable hysteresis and the use of a single winding strand or filament, which is secured to the pulleys, achieves and maintains substantially equal tension therein.

While a variety of materials such as titanium foil and fibers of carbon stainless steel, polyimide, tungsten, glass and boron compositions can be used to form the filaments, tapes, loops or the like for supporting the lower pulleys 208, 210 from the upper pulleys 202, 204, boron monofilament such as that commercially available from Avco Textron is the preferred material due to its strength and stability and the relative ease of manufacture when using boron monofilament strands. In a working embodiment of the pendulous compensator 200, the multiple (three) looped strands 220, 222 of four mil (0.004 inch) boron monofilament provided adequate strength to meet the shock requirements of construction field service and to satisfy stringent production drop testing of light beam projectors incorporating a pendulous compensator 200 including the lower pulleys 208, 210, the pendulum mirror 212, and calibration means described hereinafter weighing in combination approximately one third (⅓) of a pound.

The pulleys each define at least one groove by means of shoulders on either side of the groove. The pulleys 202, 204, 208 and 210 each define three grooves 204A by means of shoulders 204B as shown in FIG. 7. The grooves 204A, combined with the springiness of the boron monofilament strands 220, 222, help maintain the strands 220, 222 in position on the pendulous compensator 200. preferably, the grooves 204A are aligned between the upper pulleys 202, 204 and the lower pulleys 208, 210 such that no lead is required. For this construction, the shoulders 204B are removed in a noncritical area of the pulleys, e.g. a segment along the bottom of the lower pulleys 208, 210, to permit advancement with multiple loops of suspending material, see FIGS. 5, 6 and 10.

Figure 8:
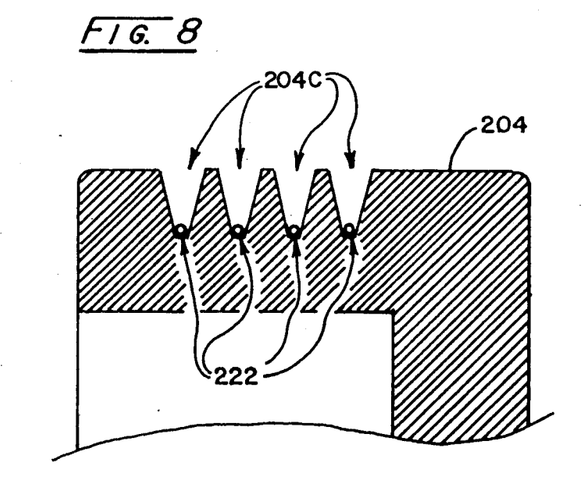

Alternately, the grooves in the pulleys 202, 204, 208, and 210 may be formed as screw threads 204C around the pulleys as shown in FIG. 8. If screw thread grooves are utilized in the pulleys, the screw threads should be the same for associated upper and lower pulleys, i.e. the pulleys 202, 20B should both have right-hand or left-hand screw threads and the pulleys 204, 210 should both have right-hand or left-hand screw threads. Such like screw thread formation facilitates passage of the strands around the grooves of the upper and lower pulleys.

If all grooves are formed as the same type screw thread, i.e. right-hand or left-hand, there may be a tendency for the lower pulleys 208, 210 to become "cocked". Accordingly, if screw thread grooves are used for the pulleys, preferably the grooves are formed as right-hand screw threads on the first upper pulley 202 and the first lower pulley 208, and the grooves are formed as left-hand screw threads on the second upper pulley 204 and the second lower pulley 210 or vice-versa to balance the skewing forces.

Figure 4:
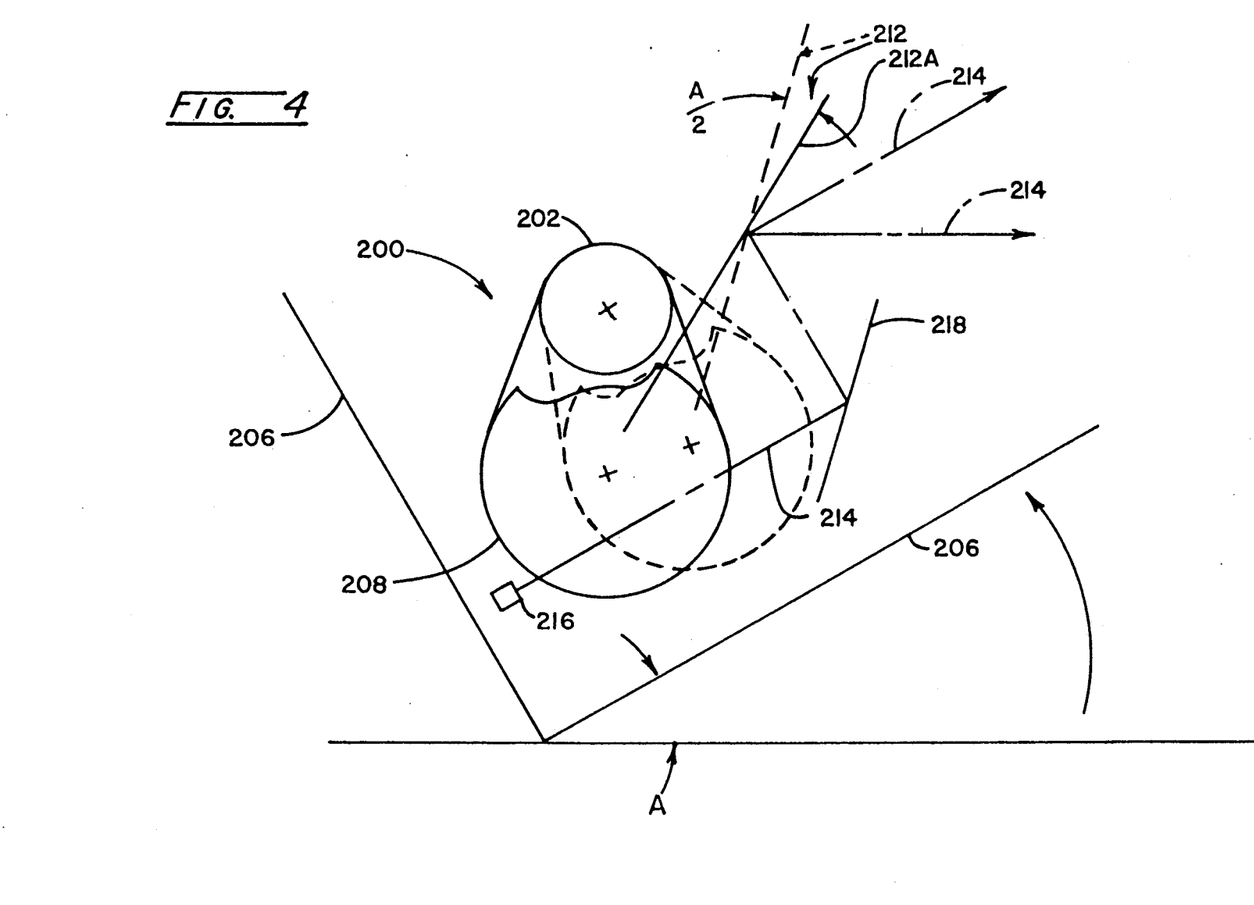
FIG. 4 is a schematic side view of the pendulous compensator of FIG. 3 illustrating the compensating operation of the pendulous compensator which maintains the horizontal orientation of a projected beam in spite of substantial tilting of an associated light beam projector.

Basic operation of the pendulous compensator 200 can best be understood by reference to FIG. 4 which schematically shows the orientation of the pendulous compensator 200 when the light beam projector housing 206 is horizontal (dashed line drawing) and when the light beam projector housing 206 has been tilted at an angle "A" of approximately 30° (solid line drawing). Due to the force of gravity and the free pendulous suspension of the support means, the lower pulleys 208, 210 will always be directly beneath the upper pulleys 202, 204. As shown by the dashed line drawing in FIG. 4, the light beam 214 is directed horizontally, i.e. parallel to the bottom of the light beam projector housing 206, when the housing 206 is horizontal. As the housing 206 is tilted, the upper pulleys 202, 204 are rotated by the same angular amount as the housing 206 since they are affixed thereto.

Since the ratio of the lower pulleys 208, 210 to the upper pulleys 202, 204 is substantially 2-to-1, the lower pulleys 208, 210 are rotated by one half the angular rotation of the housing 206. In addition, the lower pulleys 208, 210 are shifted such that they remain positioned beneath the upper pulleys 202, 204. As can be verified by known principles of geometry and optics and as illustrated by FIG. 4, such movement of the lower pulleys 208, 210 and the pendulum mirror 212 causes the laser beam 214 to continue to be reflected from the pendulum mirror 212 in the desired horizontal direction. It is noted that the pendulous compensator 200 compensates for a wide range of tilt angles of a light beam projector incorporating the compensator, and does so without complex, expensive bearings. Further, the pendulous compensator 200 can stably tolerate the harsh environment typical of a construction site.

As previously noted, the ratio of the lower pulleys 208, 210 to the upper pulleys 202, 204 is substantially 2-to-1. While it is desireable for the sake of accuracy of the pendulous compensator 200 to precisely machine the pulleys 202, 204, 208, 210 to maintain the 2-to-1 ratio, it is possible to relax the precision of the machining of the pulleys 202, 204, 208, 210 and thereby their expense by incorporating calibration means into the pendulous compensator 200 for adjusting the center of gravity of the lower pulleys 208, 210 to thereby calibrate the pendulous compensator 200. In fact, in certain applications it may be desireable to slightly alter the 2-to-1 ratio and then utilize calibration means for best accuracy of the compensator.

The calibration means preferably comprises at least one selectively positionable calibration member movable relative to the lower pulleys 208, 210 to calibrate the pendulous compensator 200. The calibration member may be secured in a selected position to maintain the pendulous compensator 200 in calibration. For example, the calibration means may comprise a first block 228 secured to the lower pulley 208 and a second block (not shown) secured to the lower pulley 210, see FIG. 3. Adjustment screws 230 are threadedly engaged with the blocks to effect calibration, with the screws 230 being secured to the blocks after adjustment to maintain calibration once attained.

An additional desireable feature of the pendulous compensator 200 is the ability to incorporate grade selection means into the pendulous compensator 200. For example, the upper pulleys 202, 204 may be formed as a single unit or coupled together, as suggested by the dashed lines extending therebetween, and mounted for rotational movement relative to the light beam projector housing 206. The grade selection means may then comprise grade control means coupled to the upper pulleys 202, 204 for rotating the upper pulleys 202, 204 relative to the light beam projector housing 206 to select the angular orientation of the light beam 214 relative to horizontal. For example, the grade control means may comprise a lever arm 232 connected to the upper pulleys 202, 204 and a lead screw 234 operably connected to the lever arm 232.

Figure 5:
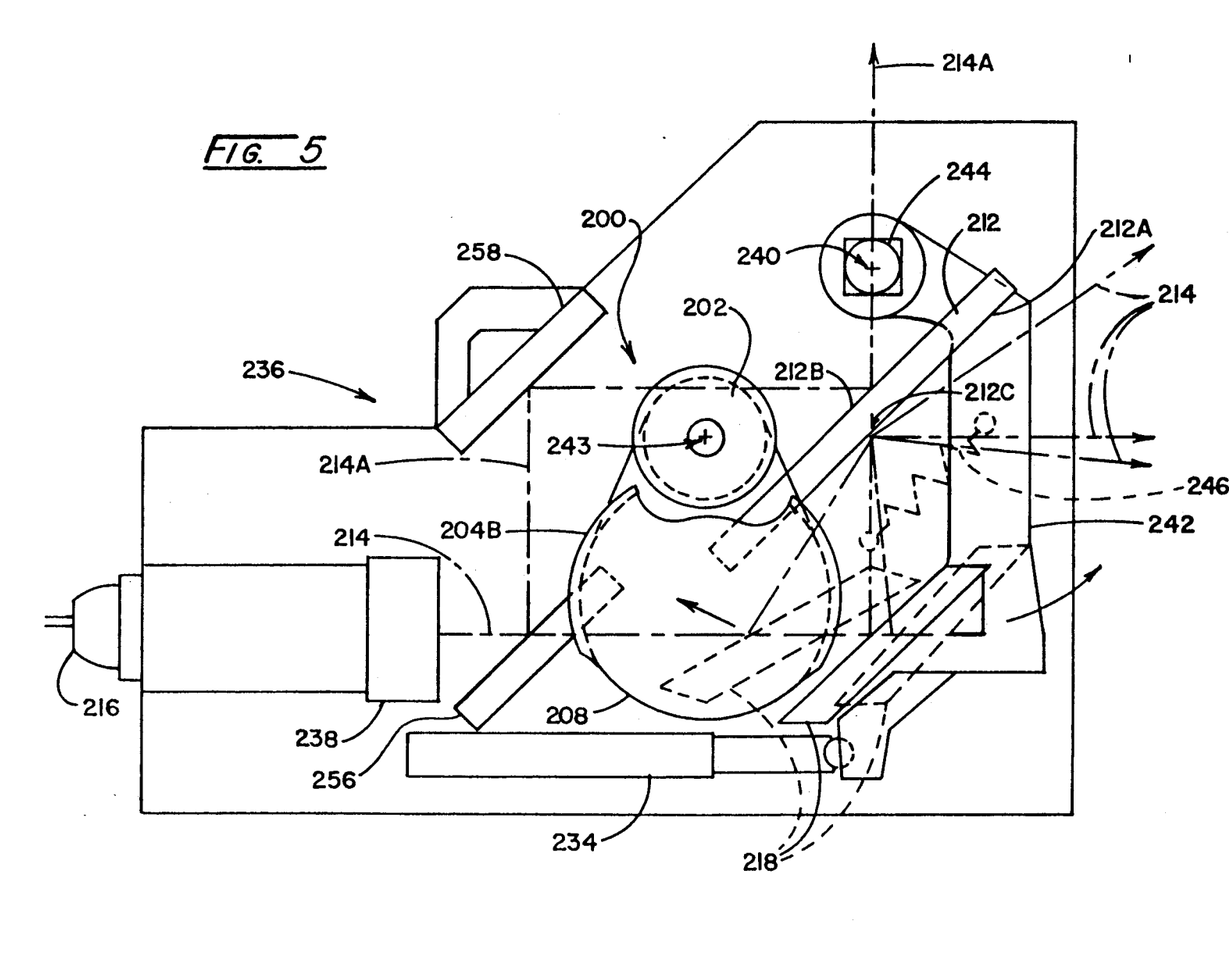
FIG. 5 is a schematic side view of a light beam projector incorporating the pendulous compensator of FIG. 3 and including means for selecting the grade angle relative to horizontal of a light beam projected therefrom.
Figure 6:
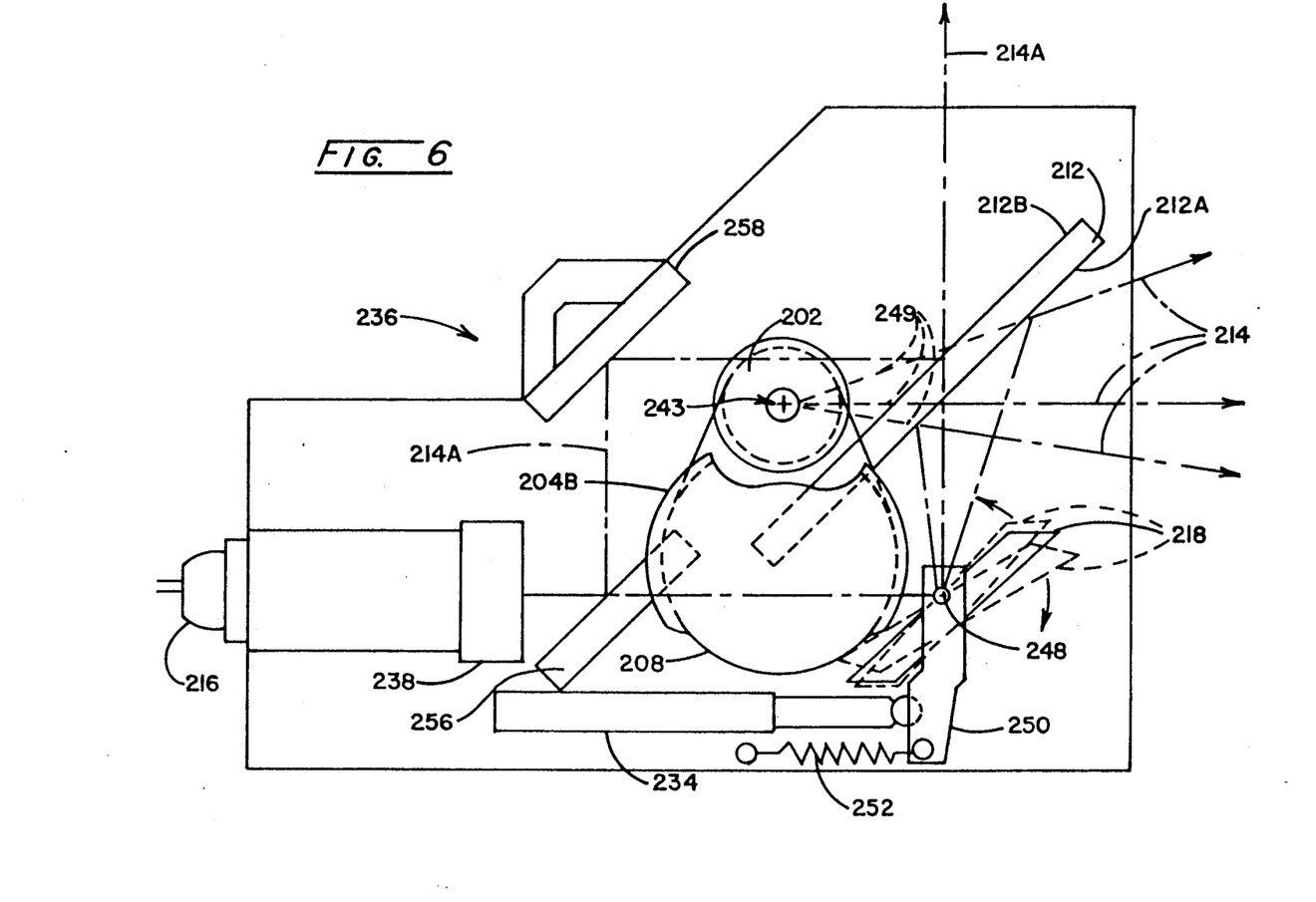
FIG. 6 is a schematic side view of a light beam projector incorporating the pendulous compensator of FIG. 3 and including alternate grade selection means.
Figure 7:
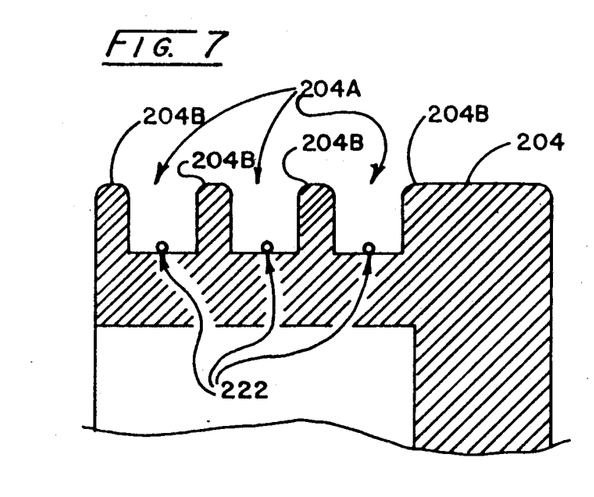
FIGS. 7 and 8 show groove formations on pulleys which may be used in the pendulous compensator of FIG. 3.

Reference is now made to FIGS. 5 and 6 which illustrate light beam projectors 236 incorporating the pendulous compensator 200 and including alternate embodiments of grade selection means incorporated therein. It is noted that certain structural components have been omitted from various drawing figures for the sake of clarity and ease of description; however, corresponding structural elements are numbered the same throughout the drawing figures. As shown in FIG. 5, the light beam projector 236 comprises a laser diode light beam source 216 which emits laser light focused by a converging lens system 238 to form the laser or light beam 214. The light beam 214 is directed upon the folding mirror 218 which in turn reflects the light beam to the pendulum mirror 212 for projection from the light beam projector 236.

In the light beam projector 236 of FIG. 5, the folding mirror 218 is mounted for rotation about an axis 240 spaced from the folding mirror 218 and serving as the pivot point for a pivot arm 242 to which the folding mirror 218 is mounted. When the pivot arm 242 and hence the folding mirror 218 is positioned as shown in the solid line drawing, the light beam 214 is projected horizontally. If the pivot arm 242 is rotated clockwise to move the folding mirror 218 to the left of its solid line representation, the light beam 214 is directed upwardly at a positive angular orientation relative to horizontal. On the other hand, if the pivot arm 242 is rotated counterclockwise to move the folding mirror 218 to the right of its solid line representation, the light beam is directed downwardly at a negative angular orientation relative to horizontal. In accordance with known principles of geometry and optics, the angular orientation of the projected light beam 214 can thus be set by controlling the pivotal movement of the pivot arm 242 and the folding mirror 218 directs the light beam 214 to a given point 212C on the pendulum mirror 212 as shown regardless of the projection angle selected. Further, the position of the point 212C on the pendulum mirror 212 or the apparent source of the projected light beam 214, remains substantially constant relative to the axis 243 of the upper pulleys 202, 204 to avoid beam offset errors due to either grade or housing angular position.

The pivot arm 242 is biased into contact with a cylindrical support 244 centered upon the axis 240 and grade control means comprising the lead screw 234 by a spring 246. In this embodiment of the light beam projector 236, the angular direction of the projected light beam 214 is determined by the position of the pivot arm 242 which is in turn controlled by the lead screw 234; however, regardless of the angular direction selected, the pendulous compensator 200 maintains that direction as the light beam projector 200 is tilted.

As shown in FIG. 6, the light beam projector 236 comprises a laser diode light beam source 216 which emits laser light focused by a converging lens system 238 to form the laser or light beam 214. The light beam 214 is directed upon the folding mirror 218 which in turn reflects the light beam to the pendulum mirror 212 for projection from the light beam projector 236. In the light beam projector 236 of FIG. 6, the folding mirror 218 is mounted for rotation about an axis 248 substantially in the reflective plane of the folding mirror 218. When the folding mirror 218 is positioned as shown in the solid line drawing, the light beam 214 is projected horizontally.

If the folding mirror 218 is pivoted clockwise relative to its solid line representation, the light beam 214 is directed upwardly at a positive angular orientation relative to horizontal. On the other hand, if the folding mirror 218 is pivoted counterclockwise relative to its solid line representation, the light beam is directed downwardly at a negative angular orientation relative to horizontal. In accordance with known principles of geometry and optics, the angular orientation of the projected light beam 214 can thus be set by controlling the pivotal movement of the folding mirror 218 which directs the light beam 214 to a range of positions along the pendulum mirror 212 as shown. Accordingly, the pendulum mirror 212 of FIG. 6 may have to be longer than the pendulum mirror 212 of FIG. 5 depending upon the range of angular adjustment to be provided.

A pivot arm 250 is biased into contact with grade control means comprising the lead screw 234 by a spring 252. In this embodiment of the light beam projector 236, the angular direction of the projected light beam 214 is determined by the pivotal position of the folding mirror 218 which is in turn controlled by the lead screw 234; however, regardless of the angular direction selected, the pendulous compensator 200 maintains that direction as the light beam projector 200 is tilted. Further, as indicated by the dashed lines 249 in FIG. 6, the geometry of the projector 236 is easily configured such that the apparent source of the projected light beam 214 is the axis 243 of the upper pulleys 202, 204 and substantially remains so to avoid beam offset errors regardless of the grade selected or housing angular position.

The light beam projectors 236 of FIGS. 5 and 6 also include vertical reference beam generating means for projecting a reference beam in a substantially vertical orientation from the light beam projectors 236. In the illustrated embodiments of FIGS. 5 and 6, the vertical reference beam generating means comprises optical means for directing a portion 214A of the light beam 214 to the side 212B of the pendulum mirror opposite to the one side 212A and the pendulum mirror 212 includes a reflective surface on the opposite side 212B to reflect the portion 214A of the light beam 214 vertically from the light beam projectors 236. As should be apparent, the pendulum compensator 200 also compensates for tilting of the light beam projectors 236 to maintain the portion 214A of the light beam 214 substantially vertical.

The optical means may comprise a beam-splitter mirror 256 which reflects the portion 214A of the light beam 214 (approximately 10–20%) to a folding mirror 258 which in turn reflects the portion 214A of the light beam 214 to the opposite side 212B of the pendulum mirror 212 from which it is projected vertically from the light beam projectors 236. Of course, the portion 214A of the light beam 214 which is directed vertically can be any portion of the light beam 214 required by the application for the light beam projectors 236. Further, the folding mirror 258 can be relocated to offset the position of the vertical beam portion 214A as desired and can be utilized for calibration.

Figure 9:
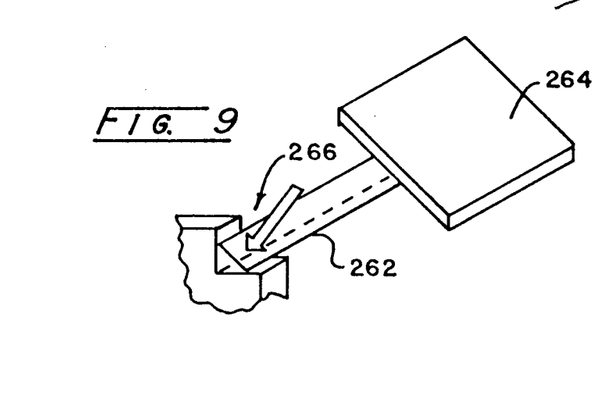
FIG. 9 is a perspective view of a mirror mounting arrangement advantageous for the pendulous compensator of FIG. 3.

The folding mirrors 218 and 258 preferably comprise substantially planar glass mirrors. Since distortion of the folding mirrors 218 and 258 may introduce intolerable errors in a light beam projector, the folding mirrors 218 and 258 are secured to glass prisms by means of a glass-to-glass bond such that distortions due to bonding dissimilar materials are substantially eliminated. As shown in FIG. 9, a glass prism 262 is thus bonded to and extends beyond a planar glass mirror 264 which may be one of the folding mirrors 218 or 258. The extension of the glass prism 262 beyond the planar glass mirror 264 provides a convenient clamping arm such that the combination of the mirror 264 and the prism 262 may be clamped by a Belleville clamp, compressed silicon or other appropriate arrangements into a light beam projector. By clamping the prism 262 at a point 266 spaced from the mirror 264, distortions in the mirror 264 due to clamping also are substantially eliminated.

Figure 10:
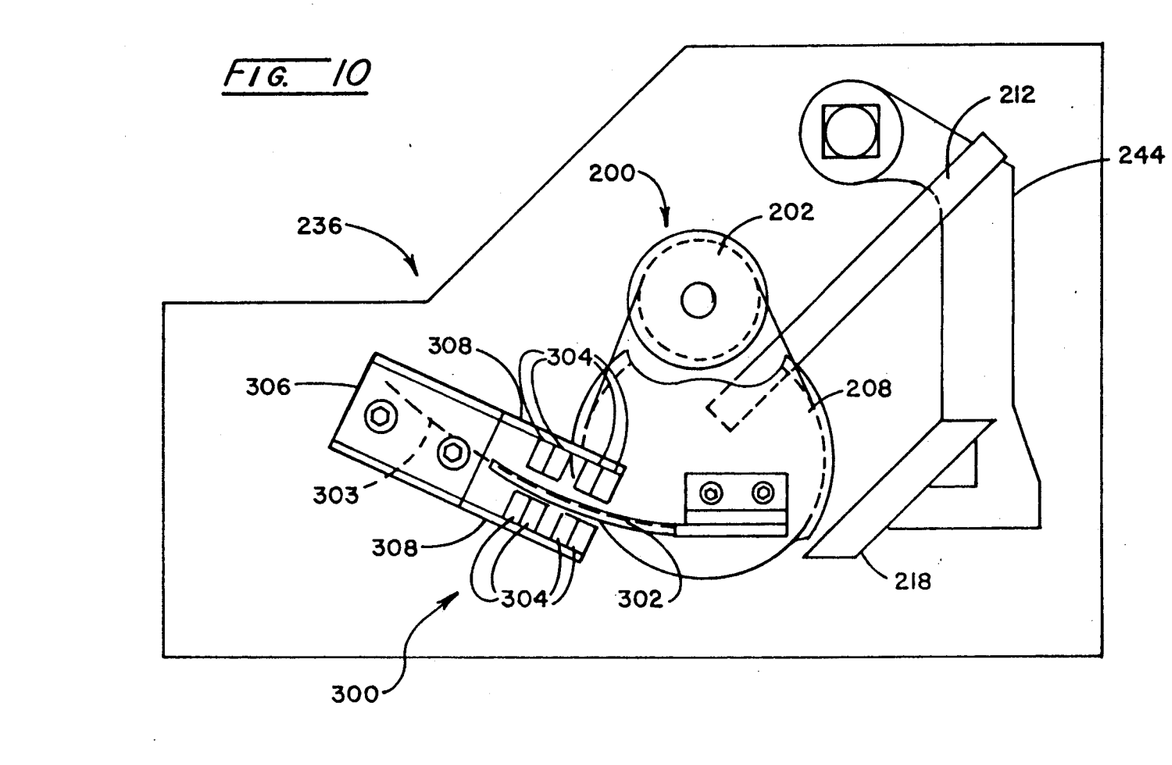
FIG. 10 is a schematic side view of a light beam projector incorporating the pendulous compensator of FIG. 3 and including an eddy current damping system in accordance with the present invention for the pendulous compensator.

The preferred embodiment of the pendulous compensator 200 includes apparatus 300 in accordance with the present invention for damping its motion to rapidly stabilize the light beam 214 emanating from the projector, such as one of the light beam projectors 236 shown in FIGS. 5 and 6. For ease of illustration and description, such damping apparatus is shown in FIGS. 10 through 14 which exclude other portions of the associated light beam projectors which are not required for an understanding of the motion damping apparatus 300. The motion damping apparatus 300 comprises at least one motion damping plate 302 which is coupled to the pendulous compensator 200. While preferably formed of copper, the damping plate 302 may also be formed of silver, tin, zinc, lead, aluminum or other electrically conducting material. Although only one motion damping plate 302 is shown in FIG. 10, a motion damping plate 302 is secured to the outer sides of each of the first and second lower pulleys 208, 210, see FIG. 11. The motion damping plates 302 are curvilinear and coupled to the pendulous compensator 200 to move in substantial conformity with a corresponding curvilinear plane 303 defined by movement of the pendulous compensator 200.

Figure 11:
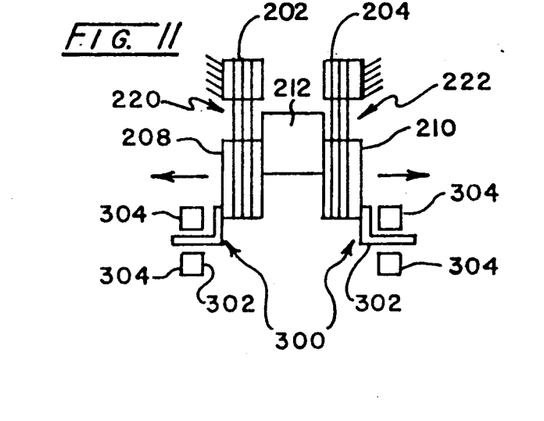
FIG. 11 is a schematic end view of the pendulous compensator of FIG. 10 illustrating a two plate eddy current damping system in accordance with the present invention for the pendulous compensator.
Figure 12:
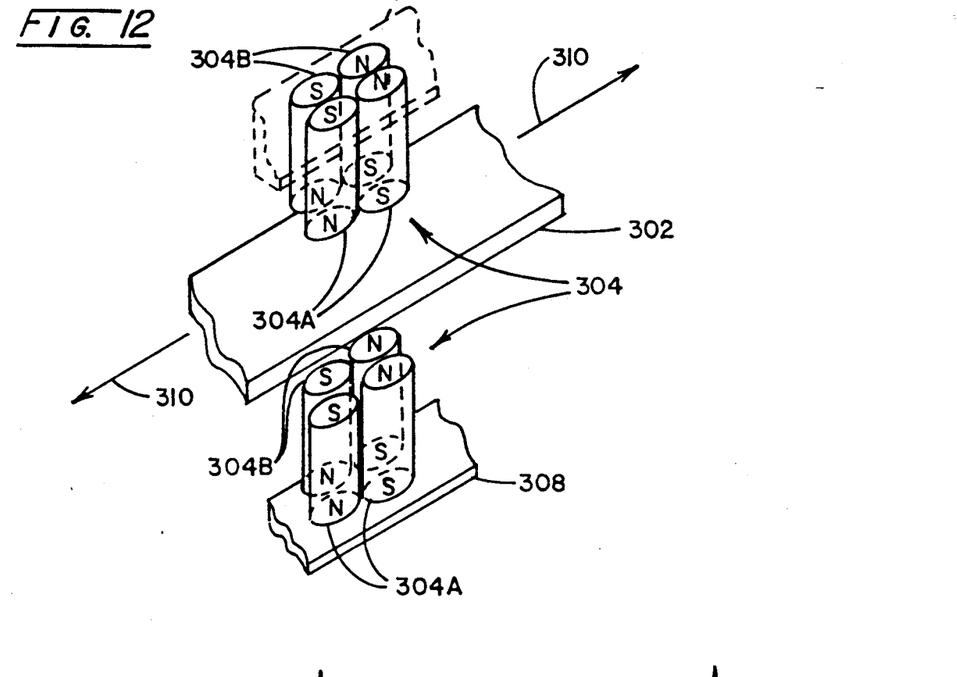
FIG. 12 is a fragmentary perspective view of a portion of the eddy current damping system of FIGS. 10 and 11 illustrating rare earth magnet orientations for the damping system.
Figure 13:
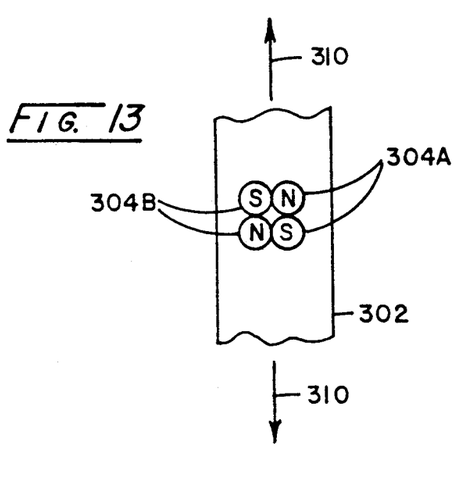
FIGS. 13 and 14 are plan views of a portion of the eddy current damping system of FIGS. 10 and 11 illustrating alternate orientations of the rare earth magnets for the damping system.
Figure 14:
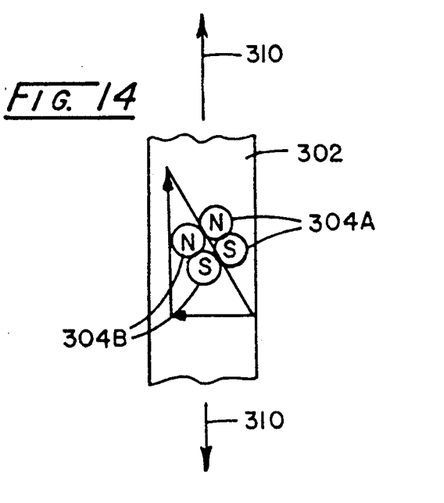

The damping apparatus further comprises magnetic means, taking the form of rare earth magnets 304 in the illustrated embodiment, and being positioned adjacent the motion damping plates 302 for generating a magnetic field through which the plates 302 pass as the result of movement of the pendulous compensator 200. Accordingly, motion of the pendulous compensator 200 is damped by the interaction of magnetic fields which are produced by the rare earth magnets 304 and by eddy currents generated in the plates 302 by movement within the magnetic fields produced by the rare earth magnets 304. The rare earth magnets 304 are mounted to one of the light beam projectors 236 by mounting plates 306 which define backing plates 308 formed of ferro-magnetic material to provide a low reluctance path portion for the magnetic fields generated by the rare earth magnets 304. The strengths of the magnets 304 and thickness of the plates 302 can be selected in view of the size of the compensator 200, necessary spacing between the magnets 304 across the plates 302 and material used to construct the plates 302 to provide critical damping or over damping for the compensator 200 as required.

By forming the motion damping plates 302 to be curvilinear, coupling the plates 302 to the pendulous compensator 200 to move in substantial conformity with a corresponding curvilinear plane defined by movement of the pendulous compensator 200 and positioning the rare earth magnets 304 on opposite sides of the corresponding curvilinear plane, the damping plates 302 are closely spaced to the rare earth magnets 304 for efficient damping operation of the apparatus. Further, this arrangement substantially maintains the spacing without contact between the plates 302 and the rare earth magnets 304 throughout the operating range of the pendulous compensator 200.

The number and orientation of the rare earth magnets 304 can be selected to vary the magnitude and direction of the damping forces applied to the pendulous compensator 200. As shown in exploded perspective in FIG. 12, preferably at least one pair of rare earth magnets 304A are positioned on each side of the corresponding curvilinear plane and hence the associated damping plate 302. The pairs of rare earth magnets 304A are aligned in a direction of maximum movement of the pendulous compensator 200 as shown by the arrows 310, i.e. in the direction of swinging movement of the first and second lower pulleys 208, 210. Further, the pairs of rare earth magnets 304A are oppositely poled relative to one another and this opposite poling is both in the direction of maximum movement of the pendulous compensator 200 and also across the corresponding curvilinear plane or damping plate 302. Thus, a north N pole is adjacent a south S pole at any pole definition point along the direction of maximum movement and also across the damping plate 302. This provides maximum motion damping in the direction of maximum movement with substantially reduced motion damping perpendicular thereto.

In the preferred embodiment of the present invention, the magnetic means comprise two pairs of rare earth magnets 304A, 304B positioned on each side of the corresponding curvilinear plane and hence the associated damping plate 302. The two pairs of rare earth magnets 304A, 304B are oppositely poled in the direction of maximum movement of the pendulous compensator 200 and also across the damping plate 302, but not in the direction perpendicular to the direction of maximum movement. This arrangement again provides maximum damping in the direction of maximum movement of the pendulous compensator 200 with substantially reduced motion damping perpendicular thereto. If more damping is desired laterally across the damping plates 302, the two pairs of rare earth magnets 304A, 304B can also be oppositely poled in that direction as shown in plan view in FIG. 13. The two pairs of rare earth magnets 304A, 304B can also be oriented at an acute angle relative to the direction of maximum movement of the pendulous compensator 200 as shown in plan view in FIG. 14. In the arrangement shown in FIG. 14, a majority of the damping force is directed in the direction of maximum movement of the pendulous compensator 200 and the remainder of the damping force is directed perpendicular thereto.

In the field, a light beam projector incorporating the present invention is set up and leveled with side-to-side leveling being of primary concern. Leveling is performed by use of adjustment screws included on a support frame and a float bubble level, all in accordance with well known practices in the industry. After such leveling, side-to-side tilting of the light beam projector is typically within ±3° which is readily accommodated by the motion damping arrangement of the present invention as shown in FIG. 11. For a tilt of 3°, the lower pulleys 208, 210 are shifted vertically only 0.00206 inches for a separation of 1.5 inches between the upper pulleys 202, 204 and the lower pulleys 208, 210. This limited movement allows close spacing between the motion damping plates 302 and the magnets 304 without concern over contact therebetween. For the light beam projectors 236 of FIGS. 5 and 6 which are equipped to project the vertical light beam portion 214A, more precise leveling particularly side-to-side leveling is contemplated. For such projectors, a gimbaled mounting, precision vials or other precision leveling arrangements could be provided.

Having thus described the pendulous compensator motion damping system of the present invention in detail and by reference to preferred embodiments thereof, it will be apparent that modifications and variations are possible without departing from the scope of the invention defined in the appended claims.

What is claimed is:

1. In a light beamprojector including a light source for generating a light beam and a pendulous compensator adapted to movably support a mirror for deflecting the light beam to compensate for tilting of the projector, apparatus for damping motion of a pendulous compensator to rapidly stabilize the light beam emanating from the projector comprising:

a least one motion damping plate formed of an electrically conducting material and coupled to the pendulous compensator, said at least one motion damping plate being curvilinear and coupled to the pendulous compensator to move in substantial conformity with a curvilinear plane defied by movement of the pendulous compensator; and magnetic means positioned adjacent to and one both sides of said at least one motion damping plate for generating a magnetic field through which said plate passes upon movement of the pendulous compensator to damp motion o the pendulous compensator by the interaction of magnetic fields produced by said magnetic means an by eddy currents generated in said plate, said magnetic means being positioned on opposite sides of said curvilinear plane whereby said at least one plate can be closely spaced to said magnetic means for efficient damping operation of said apparatus and said spacing is substantially maintained without contact between said plate and said magnetic means through the operating range of said pendulous compensator.

2. Apparatus for damping motion of a pendulous compensator as claimed in claim 1 wherein said magnetic means comprises at least two rare earth magnets positioned on a first side of said curvilinear plane and at least two rare earth magnets positioned on a second side of said curvilinear plane, said rare earth magnets on each side of said curvilinear plane being aligned and oppositely poled relative to one another in a direction of maximum movement of said pendulous compensator and said magnets on opposite sides of said curvilinear plane being substantially aligned with one another and oppositely poled across said curvilinear plane.

3. Apparatus for damping motion of a pendulous compensator as claimed in claim 2 wherein said magnetic means comprises two or more sets of at least two rare earth magnets, said sets being like poled in a direction perpendicular to the direction of maximum movement of said pendulous compensator.

4. Apparatus for damping motion of a pendulous compensator as claimed in claim 2 wherein said magnetic means comprises two or more sets of at least two rare earth magnets, said sets being oppositely poled in a direction perpendicular to the direction of maximum movement of said pendulous compensator.

5. Apparatus for damping motion of a pendulous compensator as claimed in claim 1 wherein said magnetic means comprises at least one pair of rare earth magnets positioned on a first side of said curvilinear plane and at least one pair of rare earth magnets positioned on a second side of said curvilinear plane, said pairs of rare earth magnets being substantially aligned and oppositely poled relative to one another both in a direction of maximum movement of said pendulous compensator and also across said curvilinear plane.

6. Apparatus for damping motion of a pendulous compensator as claimed in claim 1 wherein said magnetic means comprises two pairs of rare earth magnets positioned on a first side of said curvilinear plane and two pairs of rare earth magnets positioned on a second side of said curvilinear plane, said pairs orf rare earth magnets being oppositely poled relative to one another bin a direction of maximum movement of said pendulous compensator and in a direction perpendicular thereto, and being substantially aligned and oppositely poled across said curvilinear plane.

7. Apparatus for damping motion of a pendulous compensator as claimed in claim 1 wherein said magnetic means comprises two pairs of rare earth magnets positioned on a first side of said curvilinear plane and two pairs of rare earth magnets positioned on a second side of said curvilinear plane, said pairs of rare earth magnets being oppositely poled relative to one another in a direction of maximum movement of said pendulous compensator and like poled in a direction perpendicular thereto, and being substantially aligned and oppositely poled across said corresponding curvilinear plane.

8. Apparatus for damping motion of a pendulous compensator as claimed in claim 7 wherein said pairs of rare earth magnets are oriented at an acute angle relative to the direction of maximum movement of said pendulous compensator whereby a majority of the damping force is directed in the direction of maximum movement of said pendulous compensator and the remainder of said damping force is directed perpendicular thereto.

9. Apparatus for damping motion of a pendulous compensator as claimed in claim 8 wherein said at least one motion damping plate s formed of copper.

10. Apparatus for damping motion of a pendulous compensator as claimed n claim 1 wherein said apparatus comprises two motion damping plates coupled to opposite sides of said pendulous compensator.

11. In a light beamproector including a light source for generating a light beam and a pendulous compensator adapted to movably support a mirror for deflecting the light beam to compensate for tilting of the projector, apparatus for damping motion of a pendulous compensator to rapidly stabilize the light beam emanating from the project comprising:

at least one motion damping plate formed of an electrically conducting material and coupled to the pendulous compensator; and magnetic means positioned adjacent said at least one motion damping plate for generating a magnetic field through which said plate passes upon movement of the pendulous compensator whereby motion of the pendulous compensator is damped by the interaction of magnetic fields produced by said magnetic means and by eddy currents generated in said plate, said pendulous compensator comprising first pulley means secured to said light beam projector for supporting said pendulous compensator, pendulum mirror means for receiving a light beam from said light beam source and reflecting said light beam in a desired angular orientation, second pulley means for supporting said pendulum mirror means beneath said first pulley means, and support means for suspending said second pulley means from said first pulley means, said at least one motion damping plate being connected to said second pulley means.

12. Apparatus for damping motion of a pendulous compensator as claimed in claim 11 wherein said at least one motion damping plate is curvilinear and connected to said second pulley means to move in substantial conformity with a curvilinear plane defined by movement of said second pulley means, said magnetic means being positioned on opposite sides of said curvilinear plane whereby said at least one plate can be closely spaced to said magnetic means for efficient damping operation of said apparatus and said spacing is substantially maintained without contact between said plate and said magnetic means throughout the operating range of said pendulous compensator.

13. Apparatus for damping motion of a pendulous compensator as claimed in claim 12 wherein said magnetic means comprises at least one pair of rare earth magnets positioned on each side of said curvilinear plane, said at least one pair of rare earth magnets being substantially aligned and oppositely poled relative to one another in a direction of maximum movement of said second pulley means and across said curvilinear plane.

14. Apparatus for damping motion of a pendulous compensator as claimed in claim 12 wherein said magnetic means comprises two pairs of rare earth magents positioned on each side of said curvilinear plane, said pairs of rare earth magnets being substantially aligned across said . curvilinear plane and oppositely poled in the direction of maximum movement of said pendulous compensator, in a direction perpendicular thereto and across said curvilinear plane.

15. Apparatus for damping motion of a pendulous compensator as claimed in claim 12 wherein said magnetic means comprises two pairs of rare earth magnets positioned on each side of said curvilinear plane, said pairs of rare earth magnets being substantially aligned across said curvilinear plane and oppositely poled in a direction of maximum movement of said pendulous compensator, like poled in a direction perpendicular thereto and oppositely poled across said corresponding curvilinear plane.

16. Apparatus for damping motion of a pendulous compensator as claimed in claim 15 wherein said pairs of rare earth magnets are oriented at an acute angle relative to the direction of maximum movement of said pendulous compensator whereby a majority of a damping force is directed in the direction of maximum movement of said pendulous compensator and the remainder of said damping force is directed perpendicular thereto.

17. Apparatus for damping motion of a pendulous compensator as claimed in claim 16 wherein said at least one motion damping plate is formed of copper.

18. Apparatus for damping motion of a pendulous compensator as claimed in claim 12 wherein said magnetic means comprises at least two rare earth magnets positioned on a first side of said curvilinear plane and at least two rare earth magnets positioned on a second side of said curvilinear plane, said rare earth magnets on each side of said curvilinear plane being aligned and oppositely poled relative to one another in a direction of maximum movement of said pendulous compensator and said magnets on opposite sides of said curvilinear plane being substantially aligned with one another and oppositely poled across said curvilinear plane.

19. Apparatus for damping motion of a pendulous compensator as claimed in claim 18 wherein said magnetic means comprises two or more sets of at least two rare earth magnets, said sets being like poled in a direction perpendicular to the direction of maximum movement of said pendulous compensator.

20. Apparatus for damping motion of a pendulous compensator as claimed in claim 18 wherein said magnetic means comprises two or more sets of at least two rare earth magnets, said sets being oppositely poled in a direction perpendicular to the direction of maximum movement of said pendulous compensator.

* * * * *

UNITED STATES PATENT AND TRADEMARK OFFICE
CERTIFICATE OF CORRECTION

PATENT NO. : 5,026,157

DATED : June 25, 1991

INVENTOR(S) : Peter S. Winckler

It is certified that error appears in the above-identified patent and that said Letters Patent is hereby corrected as shown below:

Col. 7, Line 35, "20B" should be --208--.

Col. 13, Line 1, "light beamprojector" should be --light beam projector--.

Col. 13, Line 19, "o" should be --of--.

Col. 13, Line 21, "an" should be --and--.

Col. 14, Line 1, "orf" should be --of--.

Col. 14, Line 3, "bin" should be --in--.

Col. 14, Line 29, "s" should be --is--.

Col. 14, Line 31, "n" should be --in--.

Col. 14, Line 34, "beamproector" should be --beam projector--.

Col. 15, Line 19, "magents" should be --magnets--.

UNITED STATES PATENT AND TRADEMARK OFFICE
CERTIFICATE OF CORRECTION

PATENT NO. : 5,026,157

DATED : June 25, 1991

INVENTOR(S) : Peter S. Winckler

It is certified that error appears in the above-identified patent and that said Letters Patent is hereby corrected as shown below:

Col. 15, line 22, delete the ".".

Signed and Sealed this

Nineteenth Day of January, 1993

Attest:

DOUGLAS B. COMER

*Attesting Officer*  *Acting Commissioner of Patents and Trademarks*